US006883064B2

United States Patent
Yoshida et al.

(10) Patent No.: US 6,883,064 B2
(45) Date of Patent: Apr. 19, 2005

(54) DISK ARRAY CONTROLLER COMPRISING A PLURALITY OF DISK ARRAY CONTROLLING UNITS

(75) Inventors: Akira Yoshida, Hadano (JP); Shuji Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 10/076,456

(22) Filed: Feb. 19, 2002

(65) Prior Publication Data

US 2003/0084237 A1 May 1, 2003

(30) Foreign Application Priority Data

Oct. 30, 2001 (JP) .......................................... 2001-331858

(51) Int. Cl.[7] .............................................. G06F 13/00
(52) U.S. Cl. .......................... 711/114; 711/111; 711/112; 711/113
(58) Field of Search ....................... 711/111–114; 714/6

(56) References Cited

U.S. PATENT DOCUMENTS

| 5,937,428 A | * | 8/1999 | Jantz ........................... 711/114 |
| 2002/0054567 A1 | * | 5/2002 | Fan ............................. 370/230 |
| 2002/0188804 A1 | * | 12/2002 | Rakvic et al. ............... 711/118 |

FOREIGN PATENT DOCUMENTS

| EP | 1132805 A2 | * | 9/2001 | ............. G06F/3/06 |
| JP | 11296313 A | * | 10/1999 | ............. G06F/3/06 |

* cited by examiner

*Primary Examiner*—Mano Padmanabhan
*Assistant Examiner*—John M Ross
(74) *Attorney, Agent, or Firm*—Mattingly, Stanger & Malur, P.C.

(57) ABSTRACT

"Disk array system is presented wherein the plurality of disk array controlling units operate as the sole disk array controller so as to restrain the performance of the cache memory sections of the respective disk array controlling units from deteriorating owing to their physical packaging locations and to maximize the performance thereof in proportion to the number of the controlling units in use. Disk array controller is provided, which controller comprises a host switch interface section, the plurality of respective disk array controlling units provided with a channel interface section, a disc interface section and a cache memory section and a mutual connection network in connection with the channel interface sections, the disk interface sections and the cache memory sections of the respective disk array controlling units. Access performance to the cache memory sections that are dispersedly disposed between the respective disk array controlling units improves so as to enhance the performance of the disk array controller in proportion to the number of the disk array controlling units in use."

12 Claims, 8 Drawing Sheets

DISK ARRAY CONTROLLER COMPRISING A PLURALITY OF DISK ARRAY CONTROLLING UNITS

FIELD OF THE INVENTION

The present invention relates to a disk array controller, especially, pertaining to the art of such controller that stores data into the plurality of magnetic disc units.

BACKGROUND OF THE INVENTION

Recently, the improvement of the processing performance of the computer system has been anxiously hoped for, among others, that of the I/O processing performance of the disk subsystem thereof being in high demand. The I/O performance of the disk subsystem (hereinafter, referred to as "subsystem") that uses a magnetic disc as memory medium is inferior in the order of three to four digits to that of the main memory of a computer incorporating a semiconductor memory unit as a memory medium. Thus, the utmost efforts have been made to date to make the I/O processing performance of the subsystem closer to that of the main memory of the computer.

There is general tendency among such large enterprises as banking facilities, security and telecommunication companies to reduce costs related to the operation, maintenance and control of the computer and storage systems by centralizing computer and storage units that have been dispersedly disposed in the past into a data center so as to systematize the above units. Thus, in particular, for a large-scale and high-end storage system, such support systems are required as channel interfaces for connecting the same system to several hundreds of host computers for network connectivity and upgraded memory capacity of several hundred terabytes or more.

On the other hand, the enlargement of the open systems market in recent years and the yet to come prevailing of the storage area network (SAN) unavoidably requires a small-scale storage system (of miniature size) having the same high function and credibility as the large-scale and high-end storage system as mentioned above.

As a method for improving the I/O processing performance of the subsystem, a so-called disk array system is known wherein the subsystem comprises the plurality of magnetic disc units, into which disc units data are stored. This system generally comprises the plurality of magnetic disc units to record the I/O data from the higher order computer and a disk array controller to receive the I/O data from the computer and to transfer the same to the plurality of magnetic disc units. For the large-scale network connection and the large volume of communication, it may be arranged such that an ultra large-scale disk array controller is set up by connecting the plurality of disk array controllers of the conventional large-scale and high-end type. The connection of the plurality of disk array controllers allows cache memory to be dispersed into the respective controllers. For the performance's sake, it is advantageous that the cache memory stores the data of the magnetic disc units connected to the storage controller while the host computer getting access to the cache memory is connected to the storage controller having the same memory. However, the happening of packaging faults and the additional installation of the magnetic disc units and the storage controllers may cause the correspondence between the host interface section and the cache memory as well as between the cache memory and the magnetic disc controllers to alter from the above advantageous arrangements. Seen from the higher order apparatus and software systems as well as viewed from the conventional architectural continuation, it is advantageous that management is directed for the sole disk array controller rather than for an ultra large-scale disk array controller connecting the plurality of disk array controlling units. Restructuring caused by the connection of the host interface with the cache memory and the magnetic disc units or the additional installation thereof requires the packaging positions thereof to be optimized, which affects the performance of the disk array system more significantly than in the prior case where the system has been constructed by the sole disk array controller.

For instances, the prior disk array controller as shown in FIG. 2 is provided with the plurality of channel interface sections 11 to execute the data transfer between the host computer 50 and the disk array controllers 2, the plurality of the disc interface sections 12 to execute the data transfer between the magnetic disc units 5 and the disk array controllers 2 and the cache memory sections 14 to temporarily store the data of the magnetic disc units 5, wherein the cache memory sections 14 are accessible from all the channel interface sections 11 and the disc interface sections 12 within one disk array controller 2. In this disk array controller 2, a mutual connection network 21 intervenes between the channel interface section 11 and the cache memory section 14.

The channel interface section 11 is provided with an interface to connect with the host computer 50 and a microprocessor, which is not shown in the drawing, to control the input and output data of the host computer 50, while the disc interface section 12 is provided with an interface to connect with the magnetic disc unit 5 and a microprocessor, which is not shown in the drawing, to control the input and output data of the magnetic disc unit 5. The disc interface section 12 performs the execution of the RAID function as well.

Where it is required to store the data more than that stored in the sole disk array controller 2 in this prior art, the plurality of disk array controllers 2 are set up, to which controllers channels are connected from the host computer 50.

Where a host computer 50 having the number of host channels more than that of those connectable to the sole disk array controller 2 is arranged for connection, the plurality of disk array controllers 2 are set up, to the respective of which controllers the host computer 50 is connected.

Where the data are transferred among the plurality of the disk array controllers 2, channels are connected to two disk array controllers 2 performing the data transfer from the sole host computer 50, through which computer the data are transferred therebetween.

Another prior disk array controller as shown in FIG. 3 is provided with a host computer 50, disk array controllers 2, an external connection network 23 intervening between the host computer 50 and the disk array controllers, the plurality of channel interface sections 11 to execute the data transfer between the host computer 50 and the disk array controllers 2, the plurality of disc interface sections 12 to execute the data transfer between the magnetic disc units 5 and the disk array controllers 2 and the cache memory sections 14 to temporarily store the data of the magnetic disc units 5, wherein the host computer 50 is through the external connection network 23 accessible to all the disk array controllers 2 and it is arranged such that the cache memory sections 14 are accessible from all the channel interface sections 11 and the disc interface sections 12 within the sole disk array controller 2. In this prior art, a mutual connection network 21 intervenes between the interface sections 11 and 12 and the cache memory sections 14.

The channel interface section 11 is provided with an interface to connect with the host computer 50 and a microprocessor, which is not shown in the drawing, to control the input and output data of the host computer 50 while the disc interface section 12 is provided with an interface to connect with the magnetic disc unit 5 and a microprocessor, which is not shown in the drawing, to control the input and output data of the magnetic disc unit 5. The interface section 12 also performs the execution of the RAID function.

SUMMARY OF THE INVENTION

In the prior art as shown in FIG. 2, the increase of the number of the disk array controllers 2 allows the number of channels to be connected with the host computer 50 and memory capacity to augment, but where it is arranged such that the host computer 50 stores the data into the plurality of disk array controllers 2, it requires the channels of the host computer 50 to be connected with all the disk array controllers 2 and the host computer 50 to grasp the specific disk array controller 2, to which the magnetic disc unit 5 storing the data in access is connected, in other words, requiring the host computer to specify the disk array controller 2 at target upon gaining access to the data.

In the prior art as shown in FIG. 3, it requires a means to manage and operate the information of all the disk array controllers 2 connected to the external connection network 23 to be provided in the same network for the purpose of operating the plurality of disk array controllers 2 as the sole disk array controller, seen from the host computer 50. The disk array controller is often used for copying the data stored in a first magnetic disc unit into a second unit. In this prior art, it is arranged such that the data are transferred through the channel interface section 11 and the external connection network 23 when the data stored in the magnetic disc unit 5 connected with a first disk array controller 2 are copied into that connected with a second controller.

In order to solve the prior issues as mentioned above, the disk array controller according to the present invention comprises a host switch interface section, a plurality of respective disk array controlling units that are provided with a channel interface section having an interface with the host switch interface section, a disc interface section connected to a magnetic disc unit and a cache memory section to temporarily store the data read out of/written into the magnetic disc unit and a mutual connection network in connection with the plurality of the channel interface sections, the disc interface sections and the cache memory sections. It is further arranged such that the cache memory sections transfer the data with the channel interface sections of the whole disk array controlling units. It may be arranged such that a mutual connection network intervenes between the host switch interface section and the plurality of channel interface sections.

The host interface section is provided with a management table to select a data transfer route based on the address requested by the host computer. In the embodiments of the present invention to be described below, the data transfer route corresponds to a path between the host switch interface section and the channel interface section.

The management table is provided with a path selection table with candidates for the data transfer paths in response to the address as requested and a history information table in which the respective paths are weighted according to the data volume thereof wherein an appropriate path is selected among those paths as selected by the path selection table on the basis of the information of the history table.

It may be arranged such that a resource management section is provided in the respective disk array controlling units to manage the operating ratio of the resources thereof and to report the same ratio through a report signal to the host switch interface section and the management table is provided with the path selection table with candidates for the data transfer paths in response to the address as requested and the history information table in which the respective paths are weighted according to the report signal of the operating ratio wherein an appropriate path is selected among those paths as selected by the path selection table on the basis of the information of the history table.

The issues to be solved and the means to solve the same as disclosed in the present invention are in more details to be described below along with the preferred embodiments thereof and the accompanying drawings.

DESCRIPTION OF THE PREFERRED EMBODIMENTS

Hereinafter, the preferred embodiments of the present invention are described below with reference to the accompanying drawings.

First Embodiment

Figure 1:
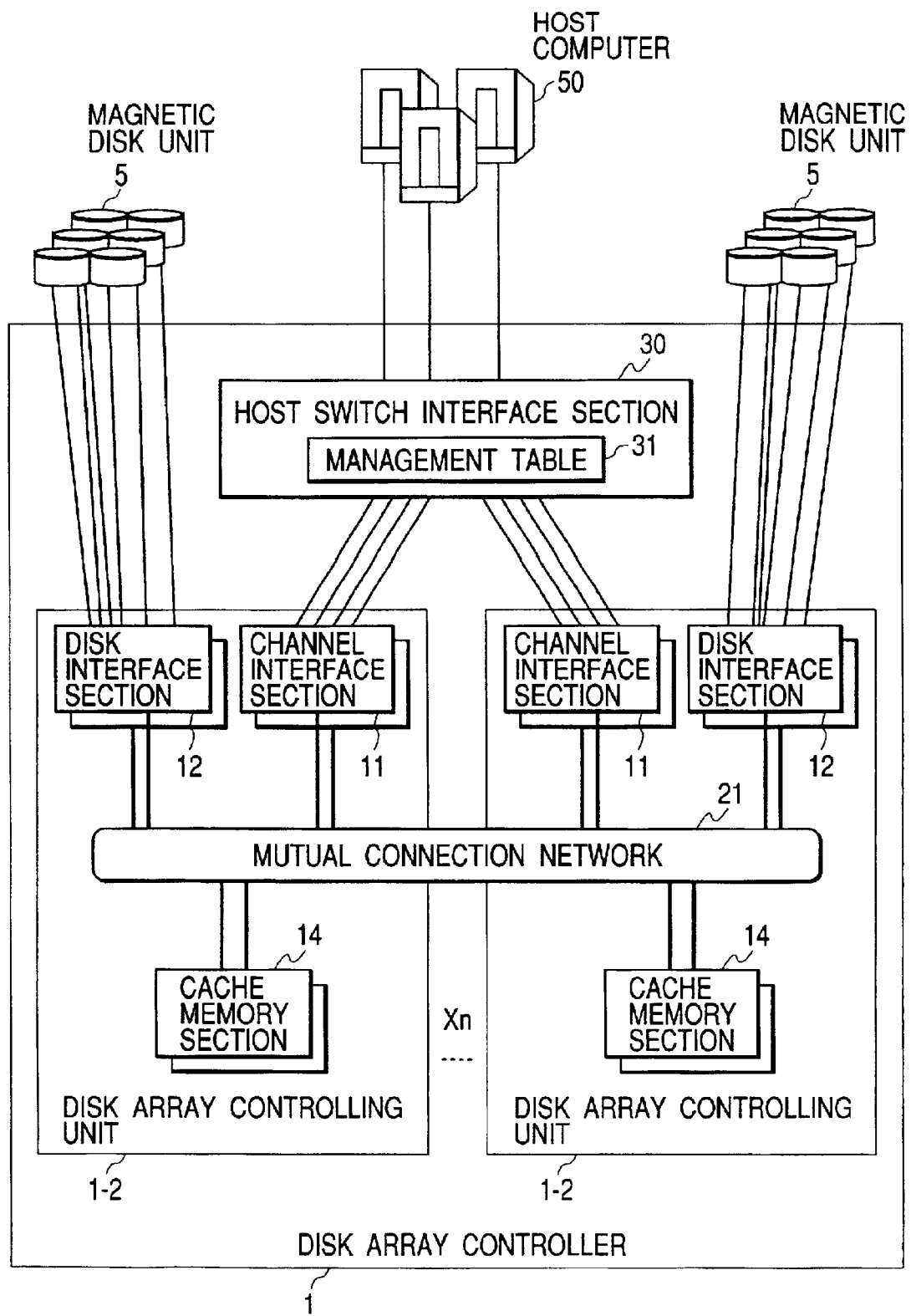
FIG. 1 is a view to show one example of the arrangement of a disk array controller according to the present invention.
Figure 2:
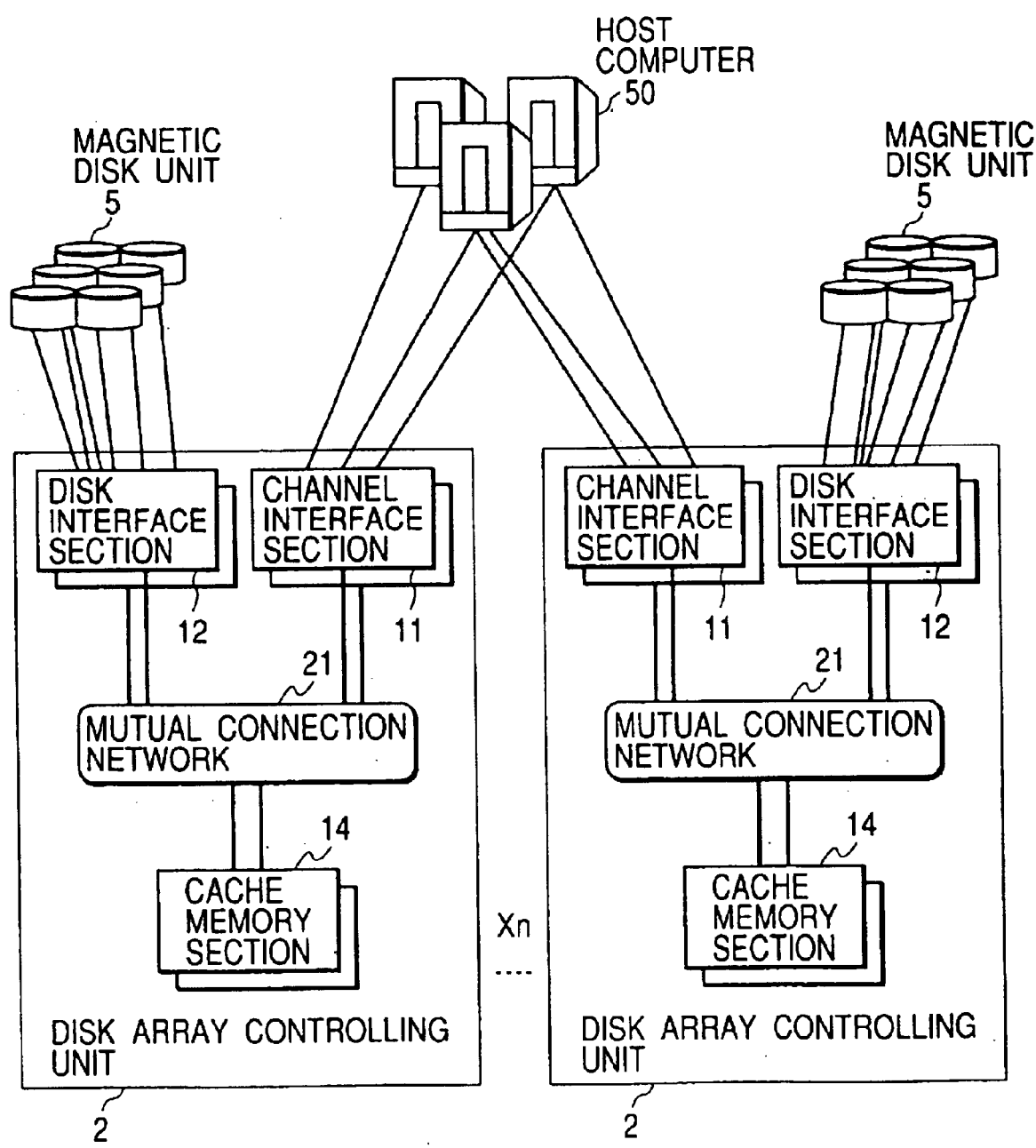
FIG. 2 is a view to show the arrangement of one prior disk array controller.
Figure 3:
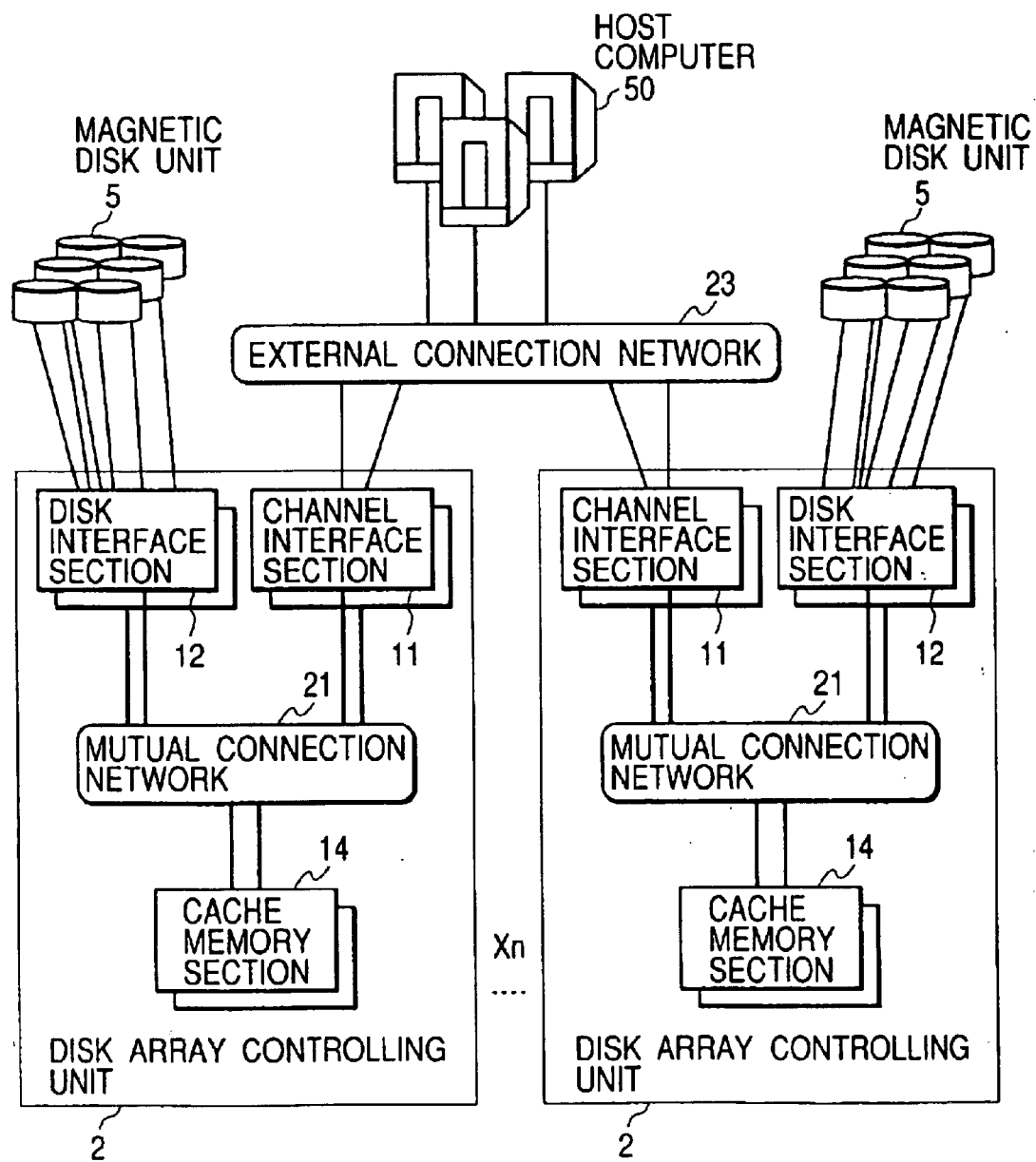
FIG. 3 is a view to show the arrangement of another prior disk array controller.
Figure 4:
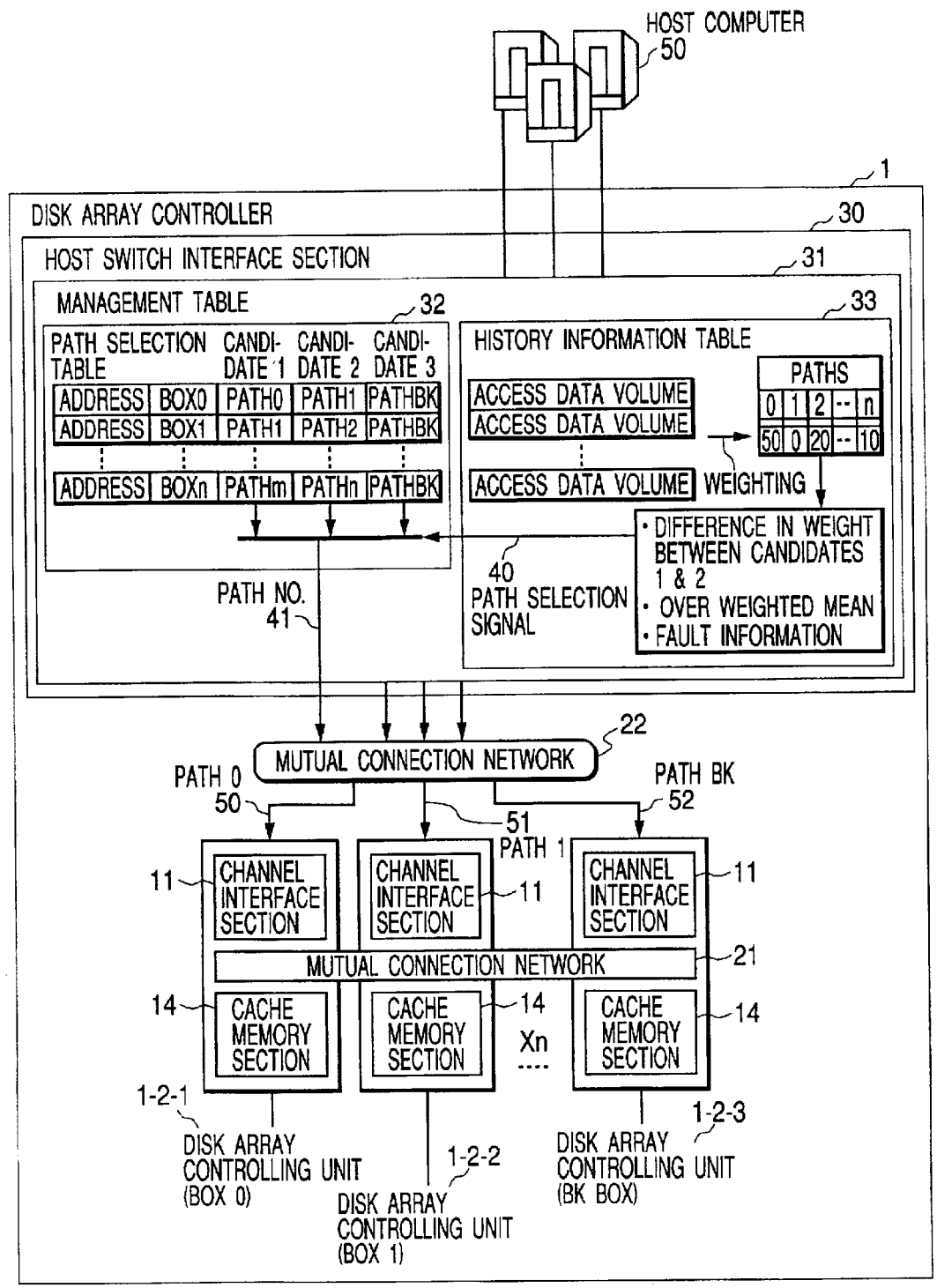
FIG. 4 is the detailed view of the arrangement of the disk array controlling unit of the controller as shown in FIG. 1.

The first embodiment of the present invention is shown in FIGS. 1 and 4.

As shown in FIG. 1, a disk array controller 1 comprises the plurality of disk array controlling units 1-2 and a host switch interface section 30. The disk array controlling unit 1-2 is provided with an interface (a channel interface section) 11 with the host switch interface section 30, an interface section (a disc interface section) 12 with a magnetic disc unit 5 and a cache memory section 14, in which unit a mutual connection network 21 intervenes between the channel and disc interface sections 11 and 12 and the cache memory section 14. The cache memory sections 14 of the respective disk array controlling units 1-2 are interconnected through the mutual connection network 21. That is to say, it is arranged such that all of the channel interface sections 11 and the disc interface sections 12 are through the mutual connection network 21 accessible to all the cache memory sections 14. The mutual connection network 21 is arranged such that the data transfer performance thereof within a disk array controlling unit is superior to that by way of the plurality of disk array controlling units. That is because there is lighter burden on the mutual connection network when the data transfer is carried out through the channel interface section of the disk array controlling unit having the cache memory section to which the host computer gets access. Further, it is arranged between the host switch interface section 30 and the plurality of channel interface sections 11 of as many disk array controlling units 1-2 such that the same section 30 is accessible to all of the cache memory sections 14. The host switch interface section 30 is capable of selecting a specific channel interface section to be connected with the host computer among the plural interface sections 11 within as many disk array controlling units 1-2 in response to the request made by the host computer. A management table 31 is provided in the host switch interface section 30, which table stores host computer access and connection information.

With reference to FIG. 1, read-out operation from the cache memory section 14 within the disk array controlling unit 1-2 by the host computer 50 is pondered. The host switch interface section 30 refers to the management table 31 therein in response to the request (read-out/writing request) made by the host computer 50 so as to find an optimum route accessible to the cache memory 14 at target and to issue such request to the channel interface section 11 to which such optimum route is connected. The channel interface section 11 that receives such request gets access to the cache memory section 14 at target through the mutual connection network 21 on the basis of the address information so as to read out the data as requested. The host switch interface section 30 weighs the data volume so as to store the relevant information into the history information table within the management table 31 upon issuing the request from the host computer 50 to the channel interface section 11.

As shown in FIG. 4, the disk array controller 1 is provided with the plurality of disk array controlling units and the host switch interface section 30. FIG. 4 shows a disk array controlling unit (BOX0) 1-2-1, a disk array controlling unit (BOX1) 1-2-2 and a disk array controlling unit (BKBOX) 1-2-3. It is arranged in FIG. 4 such that the BKBOX is used as a back-up disk array controlling unit. The disk array controlling units (BOX0) 1-2-1, (BOX1) 1-2-2 and (BKBOX) 1-2-3 as shown in FIG. 4 respectively are provided with a channel interface section 11 interfacing with the host switch interface section 30, an interface section with the magnetic disc unit, which section is not shown in the drawing and a cache memory section 14 wherein a mutual connection network 21 that extends across the plurality of disk array controlling units intervenes between the channel interface sections 11 and the cache memory sections 14. The host switch interface section 30 is connected through a PATH0 50, a PATH1 51 and a PATHBK 52 with the plurality of channel interface sections of as many disk array controlling units. A management table 31 is provided in the host switch interface section 30, in which table a path selection table 32 and a history information table 33 are provided, from which information table a path selection signal 40 is output to the path selection table 32, on the basis of which signal a PATH NO. 41 is selected.

With reference to FIG. 4, the operation of the host switch interface section 30 is pondered when the host computer 50 gains access to the cache memory section 14 of the disk array controlling unit (BOX0) 1-2-1. Upon the arrival of a request from the host computer 50 to the host switch interface section 30, the path selection table 32 is referred to, and on the basis of the address as requested, the specific disk array controlling unit that packages the cache memory section 14 storing the data at the computer's request is discernable among the controlling units (BOX0) 1-2-1, (BOX1) 1-2-2 and (BKBOX) 1-2-3. It is supposed herein that the host computer makes a request to get access to the cache memory section 14 of the BOX0 1-2-1, so that this controlling unit is selected. The storage in the path selection table 32 in the form of the path numbers of the access route information to the respective cache memory sections 14 from the host switch interface section 30 allows the specific path candidates to be discerned on the basis of the address as requested and with reference to the table 32. It is supposed herein that the host computer makes a request to get access to the cache memory section 14 of the BOX0 1-2-1, so that PATH0 50, PATH1 51 and PATHBK 52 in correspondence for CANDIDATES 1, 2 and 3 are stored in the selection table. The number of the path candidates to be stored in the table 32 is arbitrary, three paths being exemplified in the present embodiment. The PATH0 50 is a path to connect the host switch interface section 30 with the BOX0 1-2-1 and the PATH1 51 being one to connect the same with the BOX1 1-2-2 while the PATHBK being one to connect the same with the BKBOX 1-2-3. Then, the path selection signal 40 that is output from the history information table 33 determines the specific path to be selected among PATH0 50, PATH1 51 and PATHBK 52. The path selection signal 40 is generated on the basis of the difference in weight between the candidates, whether it is over weighted mean and fault information and so forth wherein the history information table 33 weighs the data volume of the respective paths from the past requests by the host computer. The path selection signal 40 defines a PATH NO. 41, which determines an access route to the cache memory section. Where the PATH0 50 is selected, access is gained through the same from the host switch interface section 30 to the cache memory section 14 of the BOX0 1-2-1. Where the PATH1 51 is selected, access is gained from the host switch interface section 30 through the same PATH1 and via the channel interface section 11 of the BOX1 1-2-2 and by way of the mutual connection network 21 extending across the plurality of disk array controlling units to the cache memory section 14 of the BOX0 1-2-1 while the PATHBK 52 being selected, access is gained from the host switch interface section 30 through the same PATHBK and via the channel interface section 11 of BKBOX 1-2-3 and by way of the mutual connection network 21 extending across the plurality of disk array controlling units to the cache memory section 14 of the BOX0 1-2-1. Provided that the data volume of the respective paths in the table 33 is uniformly weighed, the PATH0 50 that is accessible in the shortest route is selected.

Figure 5:
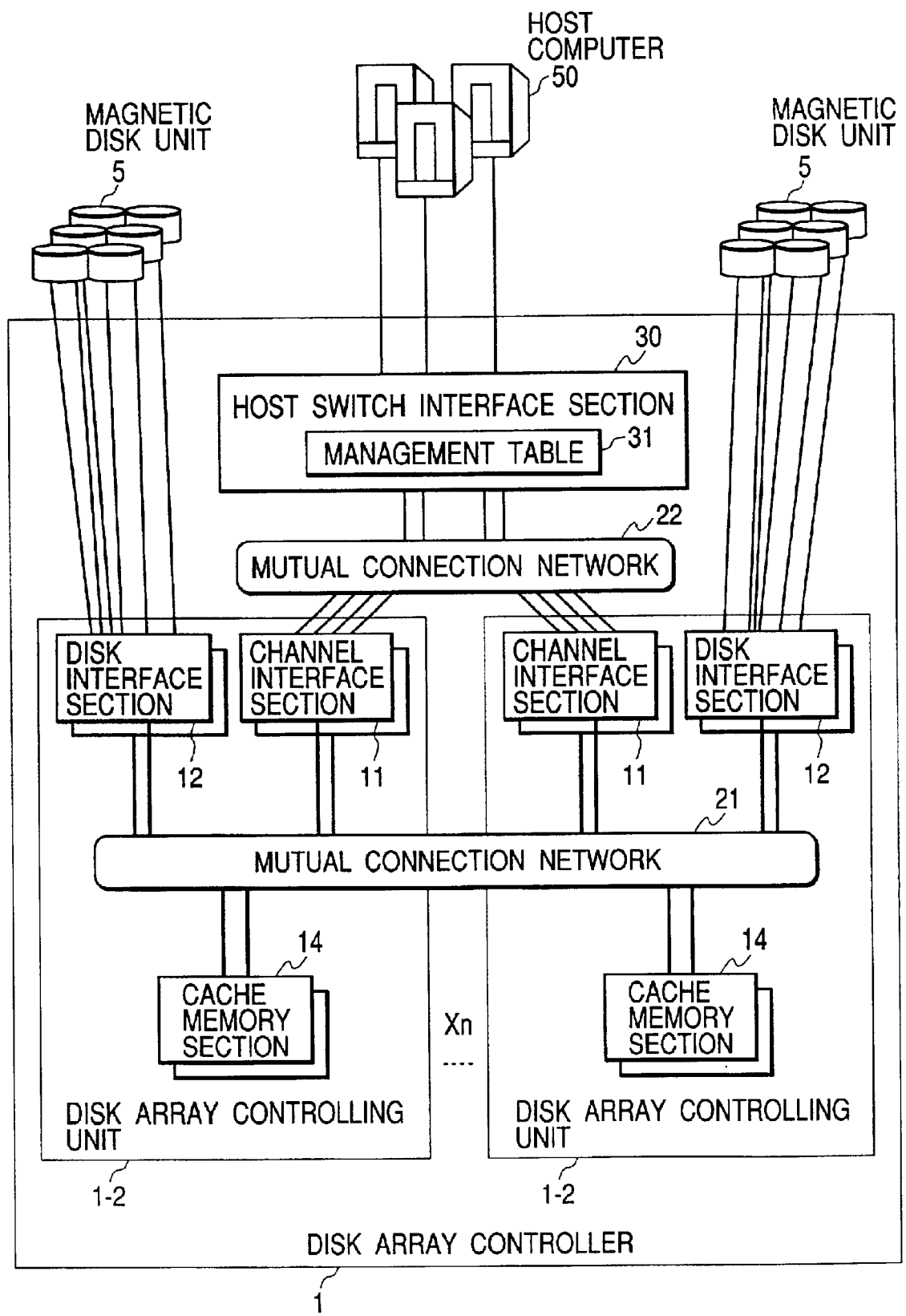
FIG. 5 is a view to show another example of the arrangement of a disk array controller according to the present invention.
Figure 6:
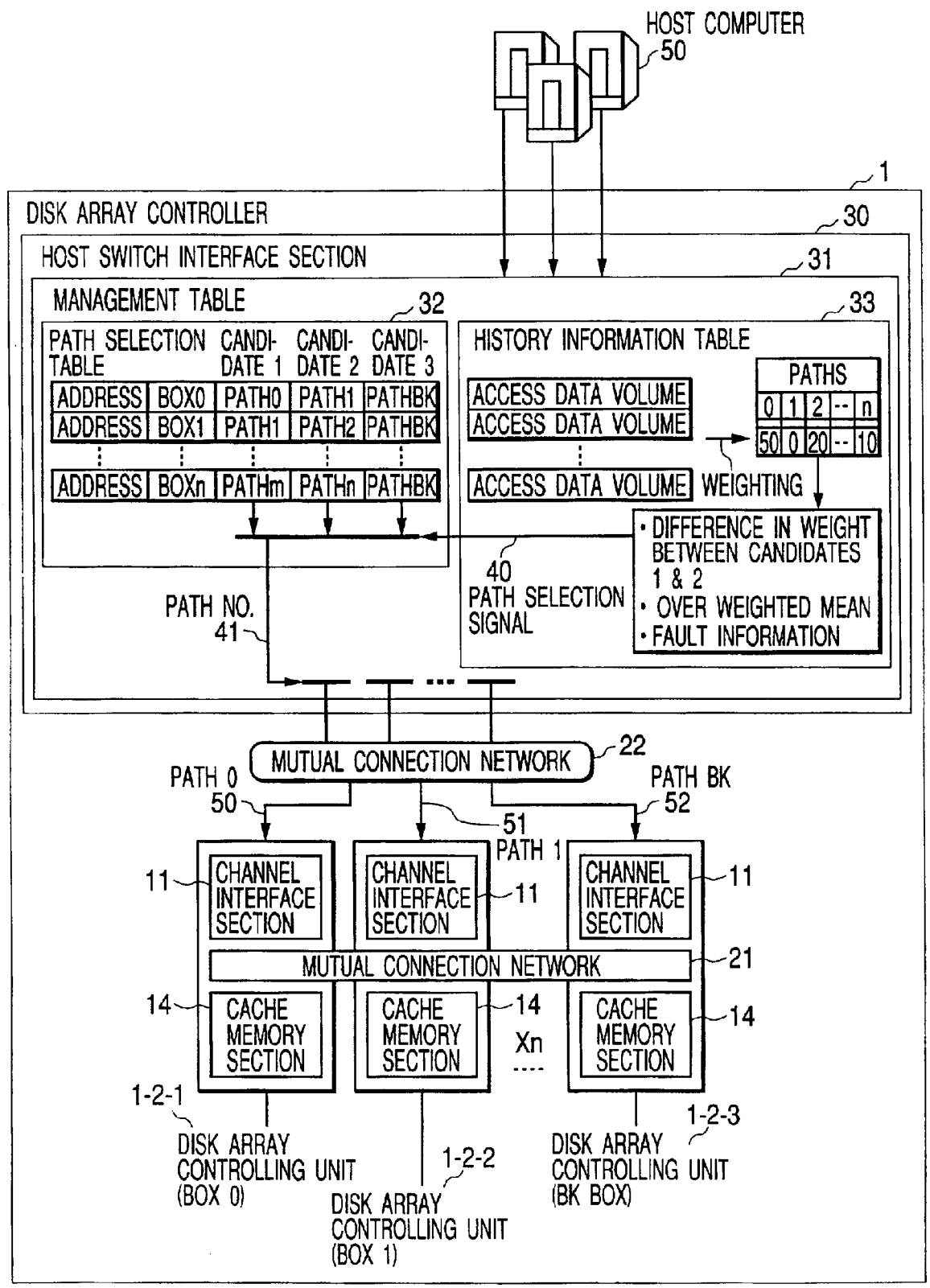
FIG. 6 is the detailed view of the arrangement of the disk array controlling unit of the controller as shown in FIG. 5.

FIGS. 5 and 6 show a modified example of the present embodiment where a mutual connection network 22 intervenes between the host switch interface section 30 and the plurality of channel interface sections 11 of as many disk array controlling units 1-2.

As shown in FIG. 5, the disk array controller 1 comprises the plurality of disk array controlling units 1-2 and the host switch interface section 30. A mutual connection network 22 intervenes between the host switch interface section 30 and the plurality of channel interface sections 11 of as many disk array controlling units 1-2. That is to say, access is gained from the host switch interface section 30 through the mutual connection network 22 to all of the cache memory sections 14. The mutual connection network 21 interconnecting the cache memory sections 14 and the mutual connection network 22 to connect the host switch interface section 30 with the plurality of channel interface sections 11 of as many disk array controlling units 1-2 independently operate. The other arrangements of the modified example as mentioned above are the same as the embodiment as shown in FIG. 1.

With reference to FIG. 5, the read-out operation of the host computer 50 from the cache memory 14 of the disk array controlling unit 1-2 is pondered. The host switch interface section 30 upon the request of the host computer 50 refers to the management table 31 within the same section 30 and finds an optimum route accessible to the cache memory 14 at target so as to issue a request through the mutual connection network 22 to the channel interface section 11 to which such optimum route is connected. The operation of the modified example as mentioned above is the same as that of the embodiment as shown in FIG. 1, excepting that the request from the host switch interface section 30 is issued through the mutual connection network 22.

With reference to FIG. 6, the arrangement of the modified example as mentioned above is the same as that of the embodiment as shown in FIG. 4, excepting that the mutual connection network 22 intervenes between the host switch interface section 30 and the disk array controlling units as to the arrangement and control of the path selection table and the history information table within the management table 31. The PATH0 50 is a path to connect the mutual connection network 22 with the BOX0 1-2-1 and the PATH1 51 is a path to connect the same network with the BOX 1-2-2 while the PATHBK 52 is a path to connect the same network with the BKBOX 1-2-3. In the path selection table 32, the access route information of the respective cache memory sections 14 from the mutual connection network 22 is stored as the path numbers. Accordingly, with reference to the path selection table 32, the address as requested results in the relevant path candidates being discernable. It is supposed herein that the host computer makes a request to get access to the cache memory section 14 of the BOX0 1-2-1, so that a PATH 50, a PATH1 51 and a PATHBK 52 in correspondence for CANDIDATES 1, 2 and 3 are stored therein. The number of the path candidates to be stored in the table 32 is arbitrary, three paths being exemplified in the present embodiment. Then, the path selection signal 40 that is output from the history information table 33 determines the specific path to be selected among the PATH0 50, the PATH1 51 and the PATHBK 52. The path selection signal 40 defines a PATH No. 41, which leads to the determination of the access route to the cache memory at target. Where the PATH0 50 is selected, access is gained from the host switch interface section 30 through the mutual connection network 22 and via the same PATH0 to the cache memory section 14 of the BOX0 1-2-1. Where the PATH1 51 is selected, access is gained from the host switch interface section 30 through the mutual connection network 22 and via the same PATH1 and by way of the channel interface section 11 of the BOX1 1-2-2 and the mutual connection network 21 extending across the plurality of disk array controlling units to the cache memory section 14 of the BOX0 1-2-1 while the PATHBK 52 being selected, access is gained from the host switch interface section 30 through the mutual connection network 22 and via the same PATHBK and by way of the channel interface section 11 of the BKBOX 1-2-3 and the mutual connection network 22 extending across the plurality of disk array controlling units to the cache memory 14 of the BOX0 1-2-1.

Second Embodiment

Figure 7:
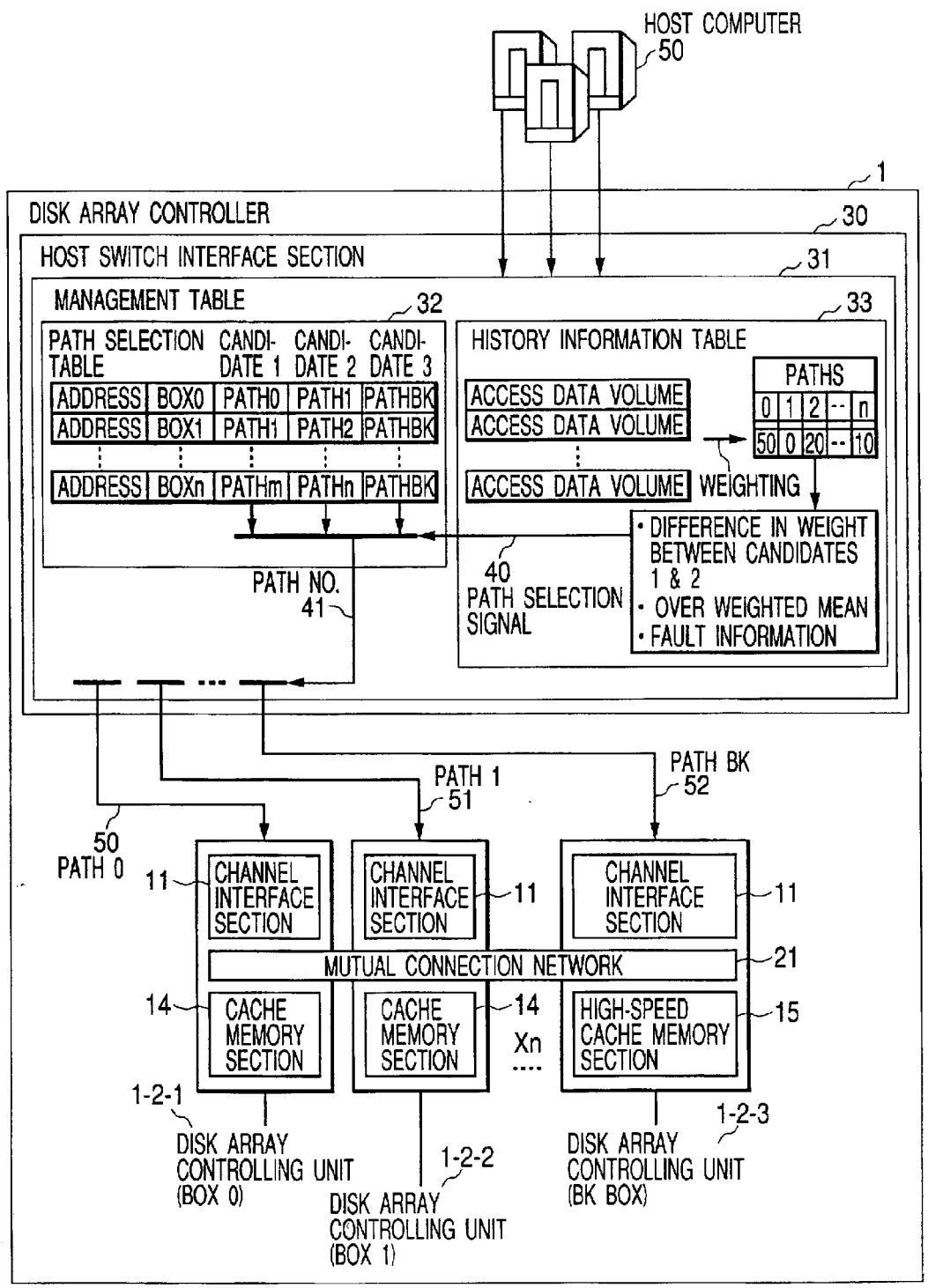
FIG. 7 is a view to show another example of the arrangement of a disk array controller according to the present invention.

FIG. 7 shows another embodiment of the present invention.

The present embodiment is characterized in that the disk array controlling unit (BKBOX) 1-2-3 is used also at the normal operation of the disk array controller, in which unit a high-speed cache memory section 15 is provided. The other arrangements thereof are the same as the first embodiment as shown in FIG. 4. With reference to FIG. 5, the operation of the host switch interface section 30 for the data transfer with high-speed access is pondered. Upon the arrival of a request from the host computer 50 to the host switch interface section 30, the path selection table 32 within the management table 31 is referred to. Based on the address as requested, it is recognizable that the data at the computer's request is packaged in the high-speed cache memory 15. The path selection signal 40 that is output from the history information table 33 causes the PATHBK 52 to be selected wherein access is gained from the host switch interface section 30 through the same PATHBK to the high-speed cache memory section 15 of the BKBOX 1-2-3. In this way, the provision of such high-speed cache memory in the specific disk array controlling unit and the effective use of the management table 31 of the host switch interface section 30 well satisfy a highly demanding request from the host computer. It is of course that the capacity of the cache memory may be altered or the paths may be transmitted with higher speed. Further, in the same way as the modified example as shown in FIG. 6, the mutual connection network may intervene between the host switch interface section 30 and the disk array controlling units. In this case, as mentioned above, the paths as stored in the path selection table 32 and as selected based on the history information table 33 are shared between the mutual connection network 22 and the disk array controlling units.

Third Embodiment

Figure 8:
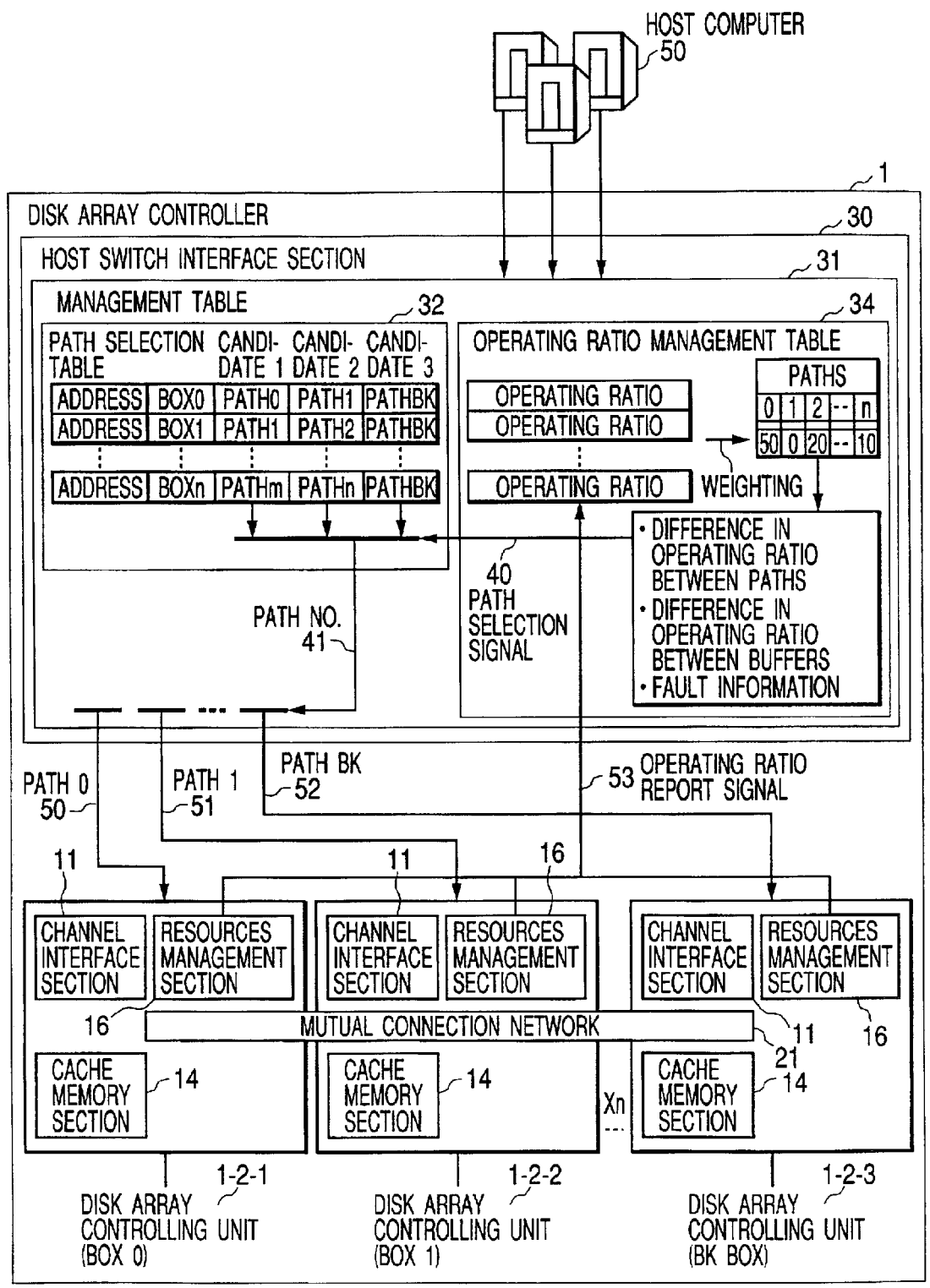
FIG. 8 is a view to show another example of the arrangement of a disk array controller according to the present invention.

FIG. 8 shows another embodiment of the present invention.

The present embodiment is the same as the first one as shown in FIG. 4, excepting for the provision of a resource management section 16 in the respective disk array controlling units, the provision of an operating ratio management table 34 in the management table 31 of the host switch interface section 30 and the connection of an operating ratio report signal 53 to the operating ratio management table 34 thereof from the resource management section 16 of the respective disk array controlling units. The management section 16 of the respective disk array controlling units manages the operating ratio of such resources as the cache memory 14 thereof, the channel interface sections 11 thereof and the disc interface sections thereof, which are not shown in the drawings, the mutual connection network 21 extending across the respective disk array controlling units and the internal paths as well as buffers thereof. The operating ratio information is reported to the management table 34 through the report signal 53, which table weighs the respective paths on the basis of the operating ratio report signal 53 transmitted from the respective disk array controlling units. The other 40 operations of the present embodiment are the same as those of the first one. Alternatively, in the same way as the modified example of the first embodiment as shown in FIG. 6, the mutual connection network may intervene between the host switch interface section 30 and the disk array controlling units. In this case, as mentioned above, the paths as stored in the path selection table 32 and as selected based on the history information table 33 are shared between the mutual connection network 22 and the disk array controlling units.

According to the present embodiment, the more detailed operational status of the controller is recognizable through the operating ratio report signal 53, which allows the specific paths to be selected in more accurate manner.

According to the present invention, where the sole disk array controller operates as the plurality of disk array controlling units, the optimum connection route is secured between the host computer and the cache memory of the respective disk array controlling units, even if the cache memory is dispersedly packaged in the respective units, which allows such resources as mentioned above to be utilized in the most suitable way. Further, without the host computer being aware of the physical packaging locations of the cache memory sections and irrespective of the packaging locations thereof, the constant cache memory access is provided as the sole disk array controller. Further, the mutual connection network extending across the cache memory sections of the respective disk array controlling units operates independently from that to connect the host switch interface section with the respective channel interface sections, which allows the request from the host switch interface section to be distributed intact into the respective disk array controlling units.

What is claimed is:

1. A disk array controller comprising:
   a host switch interface section that is connected to a host computer;
   a plurality of respective disk array controlling units that are provided with a channel interface section interfacing with said host switch interface section, a disc interface section that is connected to a magnetic disc unit and a cache memory section that temporarily stores data as read out of or written into said magnetic disc unit; and
   a mutual connection network in connection with the channel interface sections, the disc interface sections and the cache memory sections of said disk array controlling units,
   wherein said cache memory sections perform a transfer of the data with the channel interface sections of said respective disk array controlling units,
   wherein in case of transferring a copy of data stored in said magnetic disk unit which is associated with first disk, array controlling unit included in said plurality of disk array controlling units, from said first disk array controlling unit to a second disk array controlling unit included in said plurality of disk array controlling units,
   said first disk array controlling unit performs a transfer of said copy of data via said mutual connection network, not via said host switch interface section, and
   wherein said host switch interface section selects a relay destination for data which is sent from said host computer to said cache memory section in said first disk array controlling unit, from the channel interface section in said first disk array controlling unit, the channel interface section in said second disk array controlling unit, or the channel interface section in another disk array controlling unit included in said plurality of disk array controlling units other than said first and second disk array controlling units, in accordance with load conditions of a path to said cache memory section in said first disk array controlling unit through said first disk array controlling unit, through said second disk array controlling unit, and through said another disk array controlling unit included in said plurality of disk array controlling units.

2. A disk array controller according to claim 1 wherein said host switch interface section is provided with a management table that selects a path of the data transfer according to an address as requested by the host computer.

3. A disk array controller according to claim 2 wherein said data transfer path is a path between said host switch interface section and the channel interface sections of said respective disk array controlling units.

4. A disk array controller according to claim 2 wherein said management table is provided with a path selection table with candidates for the data transfer paths in response to said address and a history information table in which the respective data transfer paths are weighted according to a data volume thereof, wherein the specific path is selected on the basis of information of said history information table among the paths as selected by said path selection table.

5. A disk array controller according to claim 1 wherein one part of the respective disk array controlling units are provided with higher-speed cache memory sections than those of the other part thereof.

6. A disk array controller according to claim 2 wherein said respective disk array controlling units are provided with a resource management section that manages an operating ratio of the resources thereof and reports said operating ratio through an operating ratio report signal to said host switch interface section, wherein said management table is provided with a path selection table with candidates for respective data transfer paths in response to said address and a history information table in which the respective data transfer paths are weighted based on said operating ratio report signal, wherein the specific path is selected based on information of said history table among the respective data transfer paths as selected by said path selection table.

7. A disk array controller comprising:
   a host switch interface section that is connected to a host computer;
   a plurality of respective disk array controlling units that are provided with a channel interface section interfacing with said host switch interface section, a disc interface section that is connected to a magnetic disc unit and a cache memory section that temporarily stores data as read out of or written into said magnetic disc unit;
   a first mutual connection network in connection with the channel interface sections, the disc interface sections and the cache memory sections of said respective disk array controlling units; and
   a second mutual connection network in connection with said host interface section and the channel interface sections of said respective disk array controlling units,
   wherein said cache memory sections perform a transfer of the data with the channel interface sections of said respective disk array controlling units,
   wherein in case of transferring a copy of data stored in said magnetic disk unit which is associated with ea4da first disk array controlling unit included in said plurality of disk array controlling units, from said first disk array controlling unit to a second disk array controlling unit included in said plurality of disk array controlling units,
   said first disk array controlling unit performs a transfer of said copy of data via said first mutual connection network, not via said host switch interface section, and wherein said host switch interface section selects a relay destination for data which is sent from said host computer to said cache memory section in said first disk array controlling unit, from the channel interface section in said first disk array controlling unit, the channel interface section in said second disk array controlling unit, or the channel interface section in another disk array controlling unit included in said plurality of disk array controlling units other than said first and second disk controlling units, in accordance with load conditions of a path to said cache memory section in said first disk array controlling unit through said first disk array controlling unit, through said second disk array controlling unit, and through said another disk array controlling unit included in said plurality of disk array controlling units.

8. A disk array controller according to claim 7 wherein said host switch interface section is provided with a management table to select a data transfer path according to an address as requested by the host computer.

9. A disk array controller according to claim 8 wherein said data transfer path is a path between said second mutual connection network and the channel interface sections of said respective disk array controlling units.

10. A disk array controller according to claim 8 wherein said management table is provided with a path selection table with candidates for the data transfer paths in response to said address and a history information table in which respective data transfer paths are weighted according to a data volume thereof, wherein the specific path is selected according to information of said history table among the respective data transfer paths as selected by said path selection table.

11. A disk array controller according to claim 7 wherein one part of the disk array controlling units is provided with higher-speed cache memory sections than other parts thereof.

12. A disk array controller according to claim 8 wherein the respective disk array controlling units are provided with a resource management section that manages an operating ratio of the resources thereof and reports said operating ratio through an operating ratio report signal to said host switch interface section, wherein said management table is provided with a path selection table with candidates for respective data transfer paths in response to said address and a history information table in which the respective data transfer paths are weighted according to said operating ratio report signal, wherein the specific path is selected according to information of said history table among the respective data transfer paths as selected by said path selection table.

* * * * *